Oct. 9, 1951 — M. SIMMONS — 2,570,396
SPRING MOUNTING FOR CHAIR SEATS AND THE LIKE
Filed Oct. 15, 1946
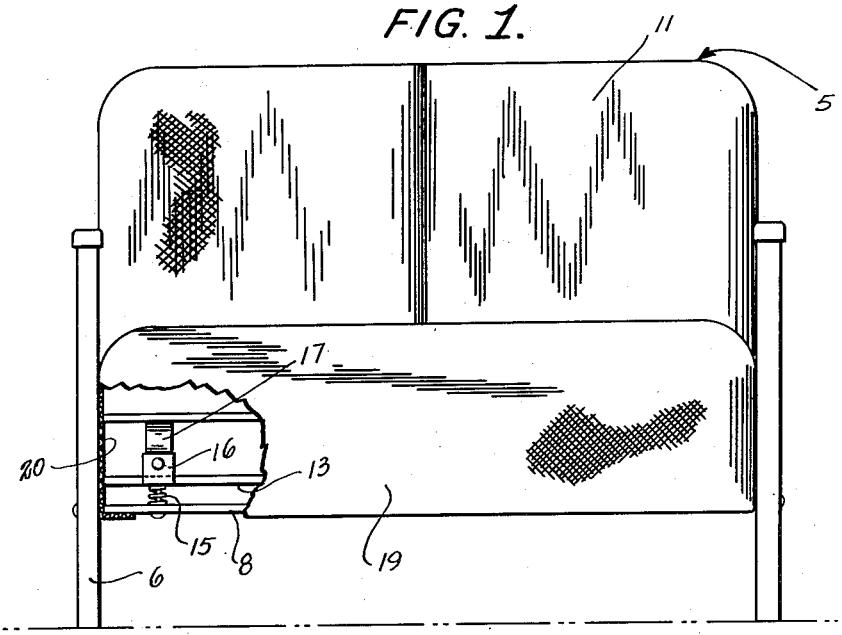
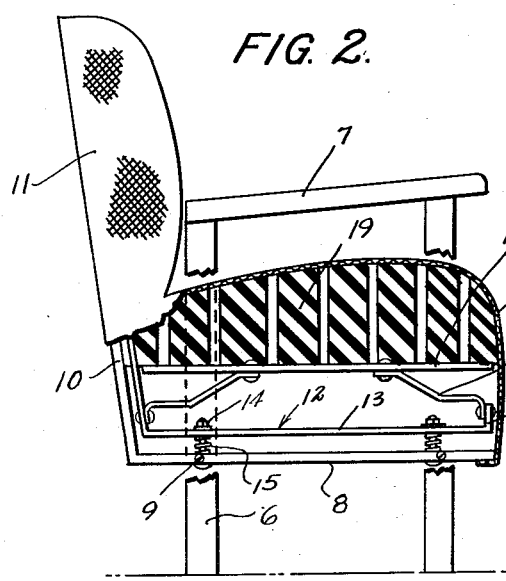 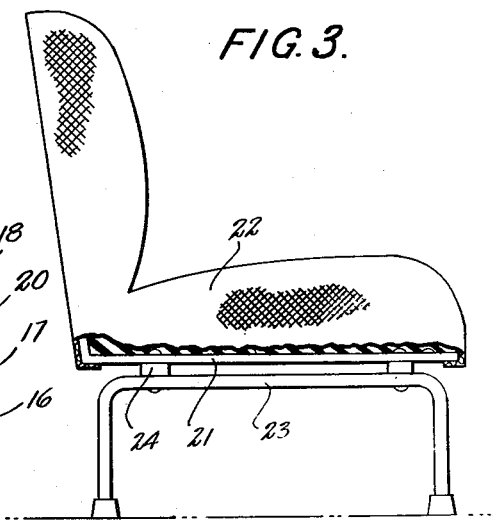
Inventor
Milton Simmons,
By
McMorrow, Berman & Davidson
Attorneys

Patented Oct. 9, 1951

2,570,396

UNITED STATES PATENT OFFICE 2,570,396

SPRING MOUNTING FOR CHAIR SEATS AND THE LIKE

Milton Simmons, Detroit, Mich.

Application October 15, 1946, Serial No. 703,445

2 Claims. (Cl. 155—179)

The present invention relates to new and useful improvements in chairs and similar furniture, and more particularly to a spring mounting for the seat or cushion of a chair.

An important object of the present invention is to supplement the resiliency of the ordinary spring seat or cushion by providing a resilient mounting for the bottom of the cushion, whereby the entire cushion is spring supported to yield to the weight of a person occupying the seat.

A further object of the invention is to provide a spring mounting for the cushion or seat of an automobile, and other vehicles, as well as for chairs, settees, and other articles of furniture.

A still further object is to provide a device of this character of simple and practical construction, which is strong and durable, efficient and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of a seat with parts broken away and shown in section.

Figure 2 is a side elevational view with the seat cushion and spring mounting therefor shown in section.

Figure 3 is a side elevational view of a modified construction with parts broken away and shown in section.

Referring now to the drawings in detail, and first with respect to the form of the invention illustrated in Figures 1 and 2 of the drawings, the numeral 5 designates a seat generally which may be constructed for use as an automobile or other vehicle seat, or for an article of furniture, such as a chair, settee, or the like, and including legs 6 having arm rests 7 at the upper end thereof.

A rigid, substantially L-shaped frame 8 has its lower portion 9 secured to the legs 6 by bolts, or the like, the upper portion of the frame, designated at 10, extending upwardly at the rear thereof to support an upholstered back 11 thereon.

A spring mounting, designated generally at 12, is positioned above the frame 8 and includes a frame 13 slidably mounted at its front and rear portions on bolts 14 extending upwardly from the rigid frame 8, the bolts having coil springs 15 positioned thereon between the frames 8 and 13, as shown to advantage in Figure 2 of the drawings, to provide spring suspension means for the spring mounting 12.

The front and rear edges of the frame 13 are formed with upstanding apertured lugs 16 to which the lower ends of spring steel arms 17 are attached, the arms extending inwardly above the frame 13 and being attached to the bottom 18 of a conventional spring cushion 19.

The upholstered back 11 and cushion 19 are provided with a cloth cover 20 which extends downwardly at its front and side edges for securing under the rigid frame 8.

From the foregoing it will be apparent that the spring mounting 12 and the spring arms 17 supporting the bottom of the cushion 19 on the spring mounting provide an added cushioning effect for the seat.

In the form of the invention illustrated in Figure 3 of the drawings, the bottom 21 of a chair cushion 22 is supported on the upper portion of inverted U-shaped metal legs 23 by means of rubber or spring bumpers 24.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claims.

Having thus described my invention, what I claim is:

1. In a mounting means for a chair including a seat and a back, a first frame including a vertically extending section having the upper end thereof adapted for the support thereon of said chair back and a horizontally disposed section extending forwardly of said vertical section adjacent the lower end thereof and secured thereto, a plurality of legs dependingly supported from said horizontal section, a plurality of vertically disposed bolts arranged in spaced relation and projecting upwardly from said horizontal section, a second frame arranged in superimposed relation with respect to said horizontal section of said first frame and supported on said bolts, resilient arms extending upwardly and inwardly from opposite ends of said second frame, and each having its lower end secured to said second frame and having its upper end adapted for the support thereon of said chair seat, and resilient means operatively connected to each of said bolts for biasing said second frame away from the horizontal section of said first frame.

2. In a mounting means for a chair including a seat and a back, a first frame including a vertically extending section having the upper end thereof adapted for the support thereon of said chair back and a horizontally disposed section extending forwardly of said vertical section adjacent the lower end thereof and secured thereto, a plurality of legs dependingly supported from said horizontal section, a plurality of vertically disposed bolts arranged in spaced relation and projecting upwardly from said horizontal section, a second frame arranged in superimposed relation with respect to said horizontal section of said first frame and supported on said bolts, resilient arms extending upwardly and inwardly from opposite ends of said second frame and each having its lower end secured to said second frame and having its upper end adapted for the support thereon of said chair seat, and resilient means embodying a spring circumposed about each of said bolts and operatively connected to the latter for biasing said second frame away from the horizontal section of said first frame.

MILTON SIMMONS.

REFERENCES CITED

The following references are of record in the file of this patent:

UNITED STATES PATENTS

| Number | Name | Date |
|---|---|---|
| 522,142 | Barrett | June 26, 1894 |
| 564,199 | Housman | July 21, 1896 |
| 1,978,343 | Davies et al. | Oct. 23, 1934 |
| 1,993,228 | Sampson | Mar. 5, 1935 |
| 2,259,534 | Reynolds et al. | Oct. 21, 1941 |
| 2,367,628 | Teague | Jan. 16, 1945 |